United States Patent [19]

Lucas, Jr. et al.

[11] Patent Number: 4,805,307
[45] Date of Patent: Feb. 21, 1989

[54] GRAPE THINNING TOOL

[76] Inventors: George A. Lucas, Jr., Rte. 2, Box 490, Delano, Calif. 93215; Richard Garcia, 14097 Avenue 272, Visalia, Calif. 93277

[21] Appl. No.: 44,669

[22] Filed: May 1, 1987

[51] Int. Cl.⁴ ........................................... B26B 29/00
[52] U.S. Cl. ..................................... 30/294; 30/317; 30/337; 47/8
[58] Field of Search ................. 30/289, 294, 317, 329, 30/337, 121, 69; 47/6–8

[56] References Cited

U.S. PATENT DOCUMENTS

| 798,129 | 8/1905 | Christy | 30/69 |
| 2,646,621 | 7/1953 | Catanese | 30/317 |

Primary Examiner—Douglas D. Watts
Attorney, Agent, or Firm—Dennis B. Haase

[57] ABSTRACT

The present invention relates to a tool for thinning bunches of young berries comprising a cutter head for housing a cutter. The cutter head is constructed with guides to permit the user to excise selected laterals from the main stem of the bunch without nicking or scraping the main stem, or coming into physical contact therewith except at the tip thereof. The tool includes a handle for controlling the cutter head. The handle serves a double function in that it is also a measuring device which permits the worker to nip off the tip of the main stem touched by the worker doing the thinning process, at a predetermined length.

9 Claims, 2 Drawing Sheets

U.S. Patent    Feb. 21, 1989    Sheet 1 of 2    4,805,307
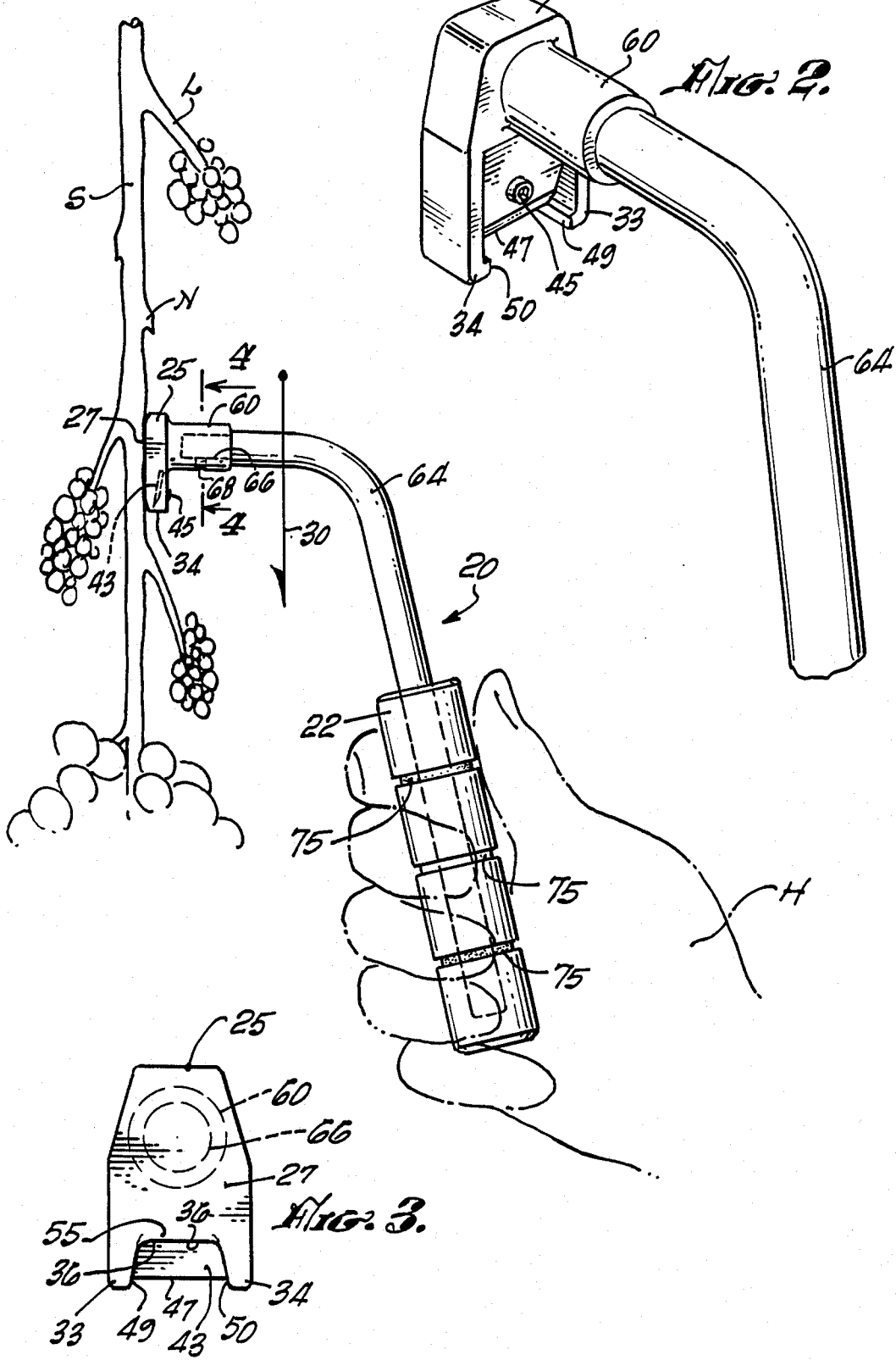

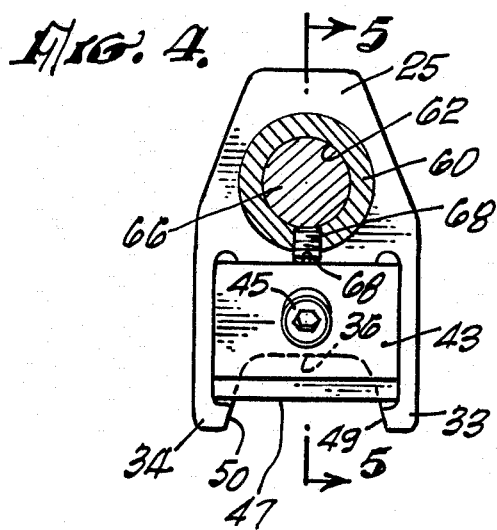
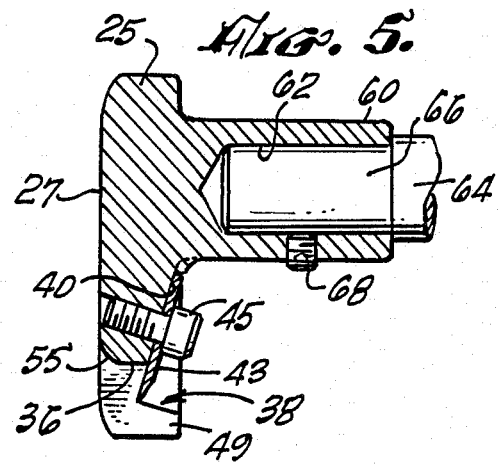
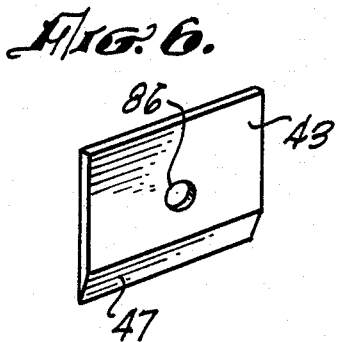
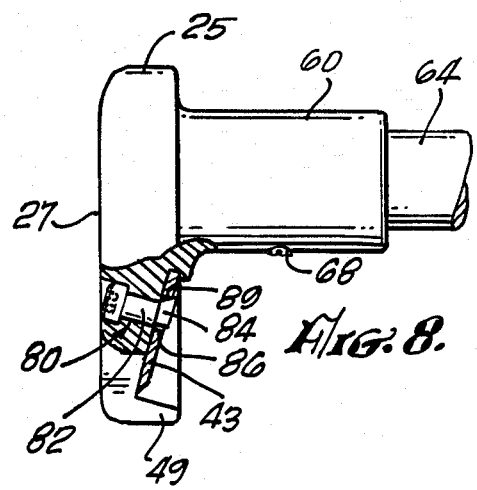
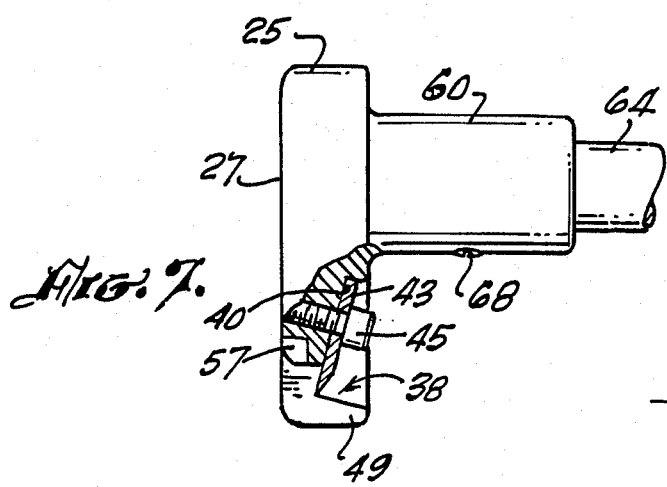
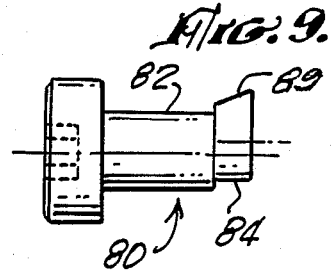

GRAPE THINNING TOOL

The present invention relates to devices for thinning clusters of berries, and more particularly, to a unique and highly versatile tool which will permit a worker, with minimum dexterity, to thin clusters of berries quickly, efficiently, and with little or no damage to the cluster.

BACKGROUND OF THE INVENTION

Grapes, and particularly table grape varieties, have become a highly profitable crop, particularly in the San Joaquin Valley regions of California. While wine varietals are, likewise, a prolific crop, they are often at the mercy of a highly volatile market, which is sensitive to a relatively few wine producers. Table grapes, and particularly, although not exclusively, the Thompson seedless variety, enjoy particularly great acceptance and, thus, a large market throughout the United States. Health conscious Americans, particularly in the eastern and mid-western areas where fresh produce is at a premium, inundate local markets in search of fresh fruit, and the Thompson seedless is particularly popular, not only because of its flavor and nutritional value, but because it is virtually ready to eat as a snack.

Table grapes, like other fresh produce, are judged on appearance and size, as well as quality. The consumer, more often than not, cannot be assured of the quality until he tastes the fruit. However, the visual imagery which is created by large, full and richly colored berries, attracts high prices with the commensurate high return to the grower.

FIELD OF THE INVENTION

Grape clusters, as they begin to develop on the vine, typically have an inordinately large number of berries. The grower has found that by thinning the clusters, the remaining berries develop into larger and more attractive grapes which will, presuming other qualities are present, bring optimum prices in the marketplace. The thinning process, unfortunately, is fraught with peril in that any damage to the main stem or to remaining berries diminishes the value of the mature grape. Moreover, it has been found that many diseases to which grapes, such as the Thompson seedless variety, are susceptible, may be transmitted from cluster to cluster and from vine to vine by human contact.

OVERVIEW OF RELATED PRIOR ART

The thinning of grape clusters, up to the advent of the present invention, is, and was typically, accomplished by scissor-type tools, and in some instances, simple curved knives. The actual thinning was accomplished in essentially the same manner as one might prune a flower or shrub, and because of lack of rigidity in the main stem or in the vine itself, the worker necessarily came into substantial physical contact with the cluster. Moreover, the type of tool previously used by the worker often caused damage to the main stem and cut and bruised adjacent berries which remained on the cluster. The use of such tools is not only time consuming, several adverse consequences result which diminish the anticipated value of the thinning process, all to the detriment of the grower.

SUMMARY OF THE PRESENT INVENTION

As previously alluded to, the present invention relates to a unique and highly versatile tool for thinning grape clusters which is so designed and constructed as to avoid the deficiencies of prior tools, such as, for example, damage to the main stem. Moreover, the tool of the present invention permits the worker with a single stroke, to thin a cluster of berries with no damage or cutting of adjacent berries which remain on the main stem. Yet another advantage of the tool of the present invention is that it permits the worker to accomplish his task with very limited physical contact with only a small area of the cluster, which contact area is then removed so that the cluster itself which remains is totally free of human contact.

THE DRAWINGS

Having thus summarized the invention within the context of its environment and use, the present invention will, in its preferred and certain alternative embodiments, now be described in detail in conjunction with the drawings, wherein:

FIG. 1 is a pictorial view of the novel tool of the present invention in actual use;

FIG. 2 is a perspective view of the working end of the tool of the present invention;

FIG. 3 is a frontal view of the head of the tool of the present invention as viewed from its guiding surface;

FIG. 4 is a view of the working head of the tool as seen from the opposite side of FIG. 3, and particularly indicating the mounting of the blade;

FIG. 5 is a side elevation of a section along lines 5—5 of FIG. 4;

FIG. 6 is a perspective view of a blade of the present invention;

FIG. 7 is a view of a modified form of the blade of the present invention;

FIG. 8 illustrates an alternative form of the blade mounting mechanism; and,

FIG. 9 is an elevation of the eccentric cam mechanism of FIG. 8.

DESCRIPTION OF THE PREFERRED EMBODIMENT

With reference now to the drawings, and initially to FIG. 1, a novel thinning tool constructed in accordance with the present invention is indicated generally at 20, and is illustrated in the particular environment for which it is uniquely suited.

The tool 20 is illustrated in a downward movement, propelled by the hand H of a worker who is grasping the handle 22 of the tool 20.

At the opposite extremity from the handle there is provided a cutting head 25, illustrated in some detail in FIGS. 2 through 5. The cutting head 25 is formed with a flat surface along its outer terminus which, in accordance with the present invention, is constructed to serve as a stem guide 27. As best illustrated in FIG. 1, the stem guide 27 causes the tool 20 to be properly positioned vis-a-vis the stem S as the tool is moved in a single stroke downwardly in the direction of the arrow 30.

The cutter head 25 is uniquely designed to protect as well as guide the tool along the stem while excising laterals or branches L in its path without nicking, cutting or bruising any other portion of the grape bunch or clusters C. To this end, the leading edge of the cutter head 25 is, as may be seen best in FIGS. 2, 3 and 4, forked so as to form parallel, longitudinal protective side rails 33 and 34 which, together with the main body portion of the cutter head 25 form a leading edge cavity, or recess, at 36.

In order to properly position and adequately support means for cutting laterals in a thoroughly safe manner within the head, while at the same time providing quick access thereto for replacement purposes, the cutter head 25 is formed with a blade pocket or recess 38. The base of the pocket 38 is an inclined flat blade support surface 40 which serves as a blade angle positioner upon which a blade 43 is secured by a fastener 45. The cutting device or blade 43 has a cutting edge 47 which, when the blade is secured in its pocket or recess 38, protrudes into the cavity 36 between the blade guide rails 33 and 34. As a further safety measure, rails 33 and 34 are formed with inwardly projecting safety guards 49 and 50, respectively.

In keeping with yet another aspect of the invention, it will be noted that the cutting edge 47 of the blade 43, when properly positioned in its recess 38, is spaced outwardly from the plane of the stem guide surface 27. This interrelationship can best be seen in FIGS. 5 and 8. The spacial relationship may vary somewhat, but is preferably no less than 1/16 of a inch and no more than 3/16 of an inch. By positioning the blade relative to the plane of the stem guide surface in this manner, each lateral severed by downward movement of the tool 20 will leave behind a short nib N. However, by preventing the blade from coming into contact with the main stem S, damage to the stem can be eliminated.

Because of the sensitivity of the main stem to damage by scraping or cutting, which would impair and inhibit growth and maturation of the remaining berries, the present invention contemplates further safety measures in the form of a chamfered or rounded transition surface 55 between the wall of the cavity 36 and the stem guide surface 27. In so doing, any sharp edges which might otherwise result from the formation of the cavity 36 are eliminated and any prospect of damage to the main stem as the tool is moved in its downward stroke is likewise further prevented.

In keeping with another object of the invention, which is to assure that the user, no matter how lacking in dexterity, will only excise those laterals which he intends to be removed, the blade guard rails 33 and 34 not only serve to protect the user from the sharp edges of the blade but are so spaced, preferably ½ inch plus or minus ⅛ inch, so that the tool will not nick or cut laterals not directly in its path. Thus, it will be seen that a downward movement of the cutter head will cause the excision or removal of all of the laterals along the longitudinal path which the cutter head traverses to the main stem S, and no others.

In order that the tool may be properly and successfully used by even the most inexperienced hand, a comfortable angle is established between the axis of the handle 22 and the stem guide surface 27. To this end, the cutter head 25 is formed with a boss 60, having a cylindrical opening 62 therein for receipt of a support post 64 of gooseneck configuration comprising either a solid rod or tubular member at the maker's discretion. The leading edge 66 is secured in the opening 62 in the boss 60 by means of a set screw 68 or by any other suitable means. It will be noted that the leading edge 66 of the gooseneck enters the boss at an angle of approximately 90° to the stem guide surface 27. The trailing edge or segment 70 of the gooseneck is secured within the handle 22 as seen in FIG. 1.

By forming the gooseneck such that an obtuse angle of between 100° and 105° exists between the longitudinal axes of the leading and trailing segments respectively, the tool is comfortably in the hand H of the worker as it is moved downwardly with a single firm stroke with the stem guide surface riding upon the main stem S of the cluster C. With a single stroke, the worker removes all of the laterals in the longitudinal path, thereby thinning the cluster as desired.

Because at the time of the thinning process the stem material is relatively flexible, the worked may find it necessary or desirable to grasp the bottom of the main stem to keep it from unnecessary flexure and to hold it in place as the stroke is delivered. However, since it is well known that several diseases may be transmitted from cluster to cluster and from vine to vine by human contact, the tool is so constructed that, upon completing the thinning process, the worker may take the tool and with one short stroke, sever the main stem immediately above the point at which the worked has grasped it, thereby removing any material from the cluster which has come in contact with the worker.

In order to assure that all such material coming in contact with the human hand has been removed, and to eliminate any confusion which might arise out of communications difficulties with the worker, the handle 22 of the tool is, in accordance with the invention, formed with several circumferential rings 75 which are longitudinally spaced along the handle. By color coding the rings, with each such ring having a different color painted on it, the worker may be instructed to hold the handle to the main stem of the cluster, and to nip off the end of the main stem at the red ring, or the blue ring, or whatever color represents the appropriate length of the stem to be left intact. In this manner, the grower can be assured that his worked has removed an appropriate amount of the main stem, and in conformity with his instructions.

Alternatives which further enhance the effectiveness of the tool include such things as providing a teflon strip or surface, or any other low drag material, on the stem guide surface 27, thereby making the tool even more slippery, and less likely to cause any damage of any kind to the main stem. With specific reference to FIG. 7, the lubricity of the tool may be further enhanced by the use of a teflon insert 57 at the transition surface 55.

Yet another variation is illustrated in FIG. 8. Because blades are capable of being nicked and eventually become dull, it is necessary, from time to time, to remove and replace them in the field. Since the blade itself is small, and the fastener shown in FIG. 5 is even smaller, and requires a wrench such as an allen wrench to remove and insert it, it is desirable in some instances to eliminate the complexities arising out of the manipulation of these very small parts under working conditions. To this end, the modification shown in FIG. 8 contemplates an eccentric cam device 80 having a post 82 rotatably mounted in the cutting head 25. An eccentric cam 84 is mounted to the post and projects into the hole 86 formed in the blade 43. The cam 84 is formed with a portion thereof angled outwardly as at 89. By rotating the post in any known manner, the cam 84 forces the blade 43 into a nested relation under lip 92 formed at the base of the boss 60. Counter rotation of the post 82, of course, releases the blade for quick replacement.

Having thus described the principal embodiment of the invention, and certain variations, thereof, what is claimed is:

1. A tool for excising laterals of berries from the main stem of a bunch, comprising,
   a cutter head;
   longitudinal guide means on said cutter head for slideable engagement with the main stem of a bunch of berries;
   said cutter head being formed with a generally rectangular cavity extending inwardly from the leading edge thereof towards the center of said cutter head to form a recess therein;
   said cutter means having a sharp edge thereon, and being mounted within said recess with said sharp edge exposed in said recess toward said leading edge of said cutter head;
   a rigid support post attached to said cutter head, said support post having a gooseneck configuration, and terminating in a handle;
   said handle being disposed at a predetermined acute angle with said guide means, whereby a user of said tool pulling downward with said guide means resting on said stem will cause laterals in the path of said cutter to be severed at a point spaced from the main stem.

2. The tool as set forth in claim 1, wherein,
   a pair of longitudinally extending, space parallel blade guide rails define the lateral extremities of said cutter head about said recess, said arms being formed with inwardly facing terminal walls to thereby protect the user from inadvertent contact with said sharp edge of said blade; and said arms being spaced by a predetermined amount so as to act as a lateral guide for the tool along the main stem.

3. The tool as set forth in claim 1, wherein,
   said handle a plurality of longitudinally spaced transverse grooves about its periphery; said grooves being spaced longitudinally to provide the user with a measuring device.

4. The tool as set forth in claim 1, wherein,
   the spacial relationship between the guide means and the cutting edge of said cutter means is no less than 1/16 inch and no more than 3/16 inch.

5. A tool for excising laterals of berries from the main stem of a bunch, comprising,
   a cutter head;
   longitudinal stem guide formed on said cutter head for slideable engagement with the main stem of a bunch of berries;
   said cutter head having a pocket formed therein, and including a cutter support surface inclined with respect to said stem guide;
   a blade mounted in said cutter head, with said blade being formed with a cutting edge thereof resting on said cutter support surface;
   the leading edge of said cutter head having parallel guide rails defining a cavity between them, said cutting edge of said cutter means being disposed in said cavity;
   the inner terminus of said cavity defining a transition surface between said stem guide and said cutter support surface thereby defining a predetermined spacial relationship between the cutting edge of said cutter and said stem guide;
   a rigid support post attached to said head, said support post having a gooseneck configuration, and terminating in a handle;
   said handle being disposed at a predetermined acute angle with said guide means, whereby a user of said tool pulling downward with said guide means resting on said stem will cause laterals in the path of said cutter to be severed.

6. The tool as set forth in claim 5, wherein said transition surface includes a teflon insert.

7. The tool as set forth in claim 5, wherein said blade is secured to said support surface by a fastener.

8. The tool as set forth in claim 7, wherein said fastener comprises a post rotatably mounted in said cutter head; means defining an eccentric cam at one end of said post which protrudes through said blade support surface, said blade having a hole therein for receipt of said cam, whereby rotation of said post will lock and unlock said blade for quick change thereof.

9. The tool as set forth in claim 8, wherein said cutter head is formed with a lip above said pocket and rotation of said post to its locked position causes said blade to nest in said pocket between said lip and said support surface.

* * * * *